United States Patent [19]

Hamilton

[11] 4,060,884

[45] Dec. 6, 1977

[54] EXTRACTOR FOR REMOVING DAMAGED BARREL LOCK FROM LOCKING RING OF A KILOWATT-HOUR METER

[76] Inventor: Earle B. Hamilton, 1423 Breton Hill Drive, Hartsville, Pa. 18974

[21] Appl. No.: 703,941

[22] Filed: July 9, 1976

[51] Int. Cl.$^2$ .............................................. B23P 19/04

[52] U.S. Cl. ........................................ 29/256; 29/263; 29/264

[58] Field of Search .......................... 29/256, 263, 264

[56] References Cited

U.S. PATENT DOCUMENTS

| | | | |
|---|---|---|---|
| 720,622 | 2/1903 | Rosenthal | 29/264 X |
| 1,395,587 | 11/1921 | McLachlan | 29/264 X |
| 1,814,830 | 7/1931 | Cooke | 29/247 |
| 2,133,697 | 10/1938 | Hansen | 29/263 X |
| 2,465,011 | 3/1949 | Culliton | 29/256 X |
| 2,487,331 | 11/1949 | Greene | 29/264 |
| 3,584,365 | 6/1971 | Cuen et al. | 29/256 |
| 3,816,899 | 6/1974 | Kitts | 29/263 |
| 3,824,672 | 7/1974 | Michelsen | 29/263 |

*Primary Examiner*—James L. Jones, Jr.
*Assistant Examiner*—J. T. Zatarga
*Attorney, Agent, or Firm*—Paul & Paul

[57] ABSTRACT

An extractor for the barrel lock of a kilowatt-hour meter comprises four components. A first component is a member having a threaded shank and an enlarged head. The head has a recess of circular cross-section the diameter of which corresponds to the outside diameter of the head of the barrel lock which is to be extracted. A pair of holes in diametral alignment are provided in the head of the extractor member adapted, when the head of the barrel lock is received within the recess of the extractor member, to register with the seal-wire opening in the head of the barrel lock. A second component, namely, a retaining pin, is inserted into the registered holes to retain the extractor member on the barrel lock. A third component is a sleeve having at its forward end a recess the shape and size of which correspond to the outside shape and size of the head of the first extractor member. At the rearward or outward end of the sleeve is an axial hole through which projects the end of the threaded shank of the first extractor member. The fourth component is a nut which is applied to the projecting end of the threaded shank and which, when tightened against the outward end of the sleeve, is effective to pull the first extractor member outwardly, thereby pulling the barrel lock outwardly.

1 Claim, 4 Drawing Figures

EXTRACTOR FOR REMOVING DAMAGED BARREL LOCK FROM LOCKING RING OF A KILOWATT-HOUR METER

BACKGROUND OF THE INVENTION

Certain known types of locking rings for electric utility kilowatt-hour meters comprise split rings having radially outward extensions at the free ends. These ends are clamped together with a tangential screw to lock the meter tightly down on the meter base. A known type of steel cover completely encloses and protects the locked ring end extensions. The cover has an open end which receives the ring end extensions and abuts the meter when in fully engaged position. The cover has a pair of inner partitions disposed parallel to and laterally outward on either side of the ring end extensions. Aligned tangential apertures are provided in the outer ends of the ring end extensions, in the partitions, and in the right side of the cover, for receiving a known form of hollow cylinder barrel lock having an annular head which extends laterally outward of the cover for a short distance and which locks the cover in place. The annular head of the barrel lock has a transverse diametral hole for insertion of a lead seal wire. The inner end of the barrel lock has a pair of opposed transverse ball detents which extend laterally outward beyond the inward partition and prevents withdrawal of the barrel lock. These detents are releasable by means of a known form of cylindrical key which is inserted into the hollow end of the barrel lock and is operated by a cammed handle provided at the outer end. This key has a longitudinally split insert element of small diameter which is insertable in the hollow of the barrel lock and is adapted for spreading the outer ends of the insert element to release the ball detent locking mechanism in the barrel lock.

Kilowatt-hour meters of electric utility power companies are frequently installed in exposed locations where they are subject to tampering. Attempts have been made, for example, to drill into the barrel lock central aperture. This action is usually not productive but often leaves a broken drill in the barrel lock aperture which prevents the key from being used to remove the barrel lock. Also, due to exposure to weather and other conditions, the inner mechanism of the barrel lock, after long periods of time, sometimes becomes so corroded that the key is inoperative to release the ball detents, and the barrel lock then cannot be removed by means of the key.

SUMMARY OF THE PRESENT INVENTION

The object of the present invention is to provide an extractor for a damaged or frozen barrel lock of a kilowatt-hour meter.

A more particular object is to provide an extractor for a barrel locked meter for bodily removing the barrel lock by grasping the head of the barrel lock and producing sufficient longitudinal pulling force to depress the ball detents against their retainers and/or to pull the detents through the aligned openings in the cover partitions and in the ring end extensions, deforming, if necessary, the openings.

BRIEF DESCRIPTION OF THE DRAWINGS

FIG. 1 shows, in phantom, a kilowatt-hour meter M mounted on a retangular metal terminal box 10 having a metal lid 11. Conventionally, the lid 11 is provided with a circular aperture whose edge is struck upwardly and then bent radially outwardly to provide a peripheral ledge and an annular external recess or crevice (not illustrated). The meter M has an outer rim (not illustrated) which rests on the peripheral ledge of the lid aperture. The meter has a cylindrical glass dome 12 provided with an external peripheral bead (not illustrated) which rests on the outer rim of the meter. The peripheral ledge of the lid 11, the rim of the meter M, and the external bead of the dome 12, have the same outer diameters and are arranged concentrically.

To prevent removal of the meter, or tampering with the meter, it is known to over a split locking ring 20 of channelshaped cross-section which, when spread at the split, is adapted to be placed ovver the meter and over the bead and rim so that the lower side of the channel is received in the annular crevice of the ledge of the lid 11 and the upper side of the channel engages over the bead of the dome, thereby to hold the meter M and the dome 12 tightly and securely to the lid 11. As seen in FIGS. 2–4, the locking ring 20 is split, and extending radially outward at the split are end extensions or flanges 21,22 which are clamped together by a screw 23. It will be seen that so long as the end extensions 21,22 are clamped together, the ring 20 cannot be removed.

Figure 1:
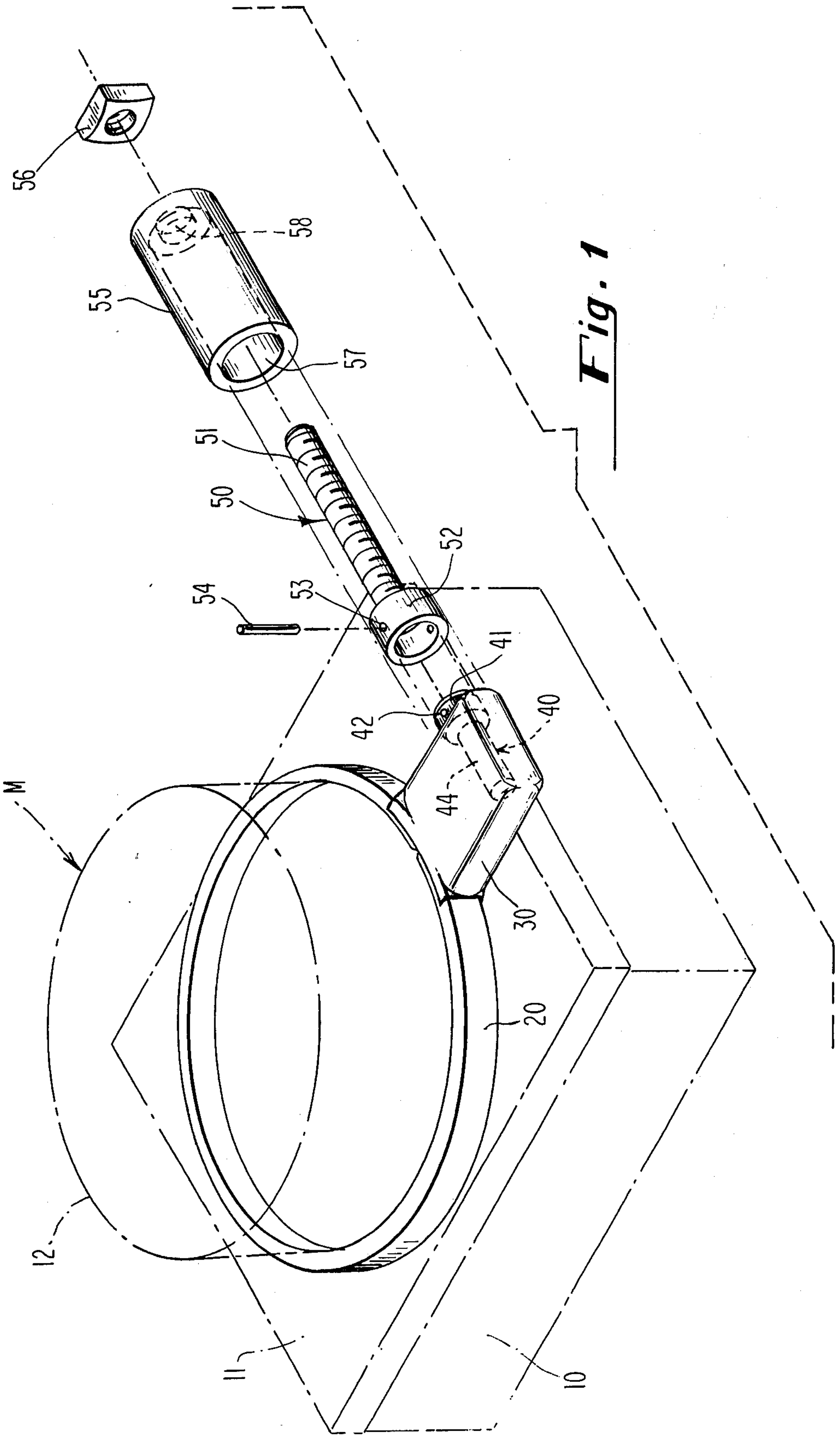
FIG. 1 is an exploded perspective view showing the barrel lock extractor of the present invention.

To prevent removal of clamp screw 23 and removal of locking ring 20, the flanges 21,22 and clamp screw 23 are covered by a steel cover housing 30 having an opening at its radially-inward side for receiving the flanges 21,22, with the inward open side of the cover housing abutting against the meter.

Extending from the front wall of the cover housing 30 toward the open side of the cover housing, are a pair of partitions 33 and 34, one of each side of the flanges 21,22 of the locking ring 20. Aligned tangential holes are provided in the partitions 33,34 and in the flanges 21,22, for receiving the hollow barrel 44 of a hardened steel barrel lock 40. Barrel lock 40 has an enlarged annular head 41 which projects very slightly through a hole in the sidewall 31 of the cover housing 30. Head 41 has therethrough, in a diametric direction, a hole 42 for receiving a lead seal wire (not shown). The inward end of the hollow barrel 44 of barrel lock 40 is provided with a pair of opposed ball detents 43 which retain the barrel lock in the position shown in FIGS. 2-3. The ball detents 43 are releasable by a cylindrical key (not shown) which is inserted into the hollow bore of the barrel lock 40 and is operated by a cammed handle at its outer end. The key has a longitudinally-split insert element of small diameter which is insertable in the hollow bore of the barrel 44 and is adapted for spreading the outer ends of the insert element to release the ball detent locking mechanism. The barrel lock and key mechanisms are known in the art and are not part of the present invention.

The meter and its locking means are ordinarily exposed to the weather and it frequently happens that, after a period of time, the barrel lock 40, due to corrosion, becomes frozen in its locked position, and extremely difficult to remove by means of the key which is ordinarily used for this purpose. Also, due to the fact that a very small portion of the annular head 41 of the barrel lock projects beyond the side wall 31 of the cover 30, the length of such projection being of the order of 3/16 inch, and the material being hardened steel, it is virtually impossible to obtain a grasp on the head for extraction by known means. The purpose of the present invention, as has already been indicated, is to provide an extractor for the barrel lock.

According to the present invention, a four-component extractor is provided. A first component is a member 50 having an elongated threaded shank 51 and an enlarged annular head 52 having a bore of a size corresponding to that of the outside diameter of the annular head 41 of the barrel lock 40. Head 52 is provided near its forward end with aligned diametral holes 53 for receiving a pin 54. Pin 54 comprises the second component of the extractor.

A third component of the extractor comprises a cylindrical sleeve 55 having at its inward end a recess or bore the diameter of which corresponds to the outside diameter of the head 52 of the first component 50. At the outward end of sleeve 55 is an axial hole 58 through which the outer end of the threaded shank 51 is adapted to project.

A fourth and final component of the extractor is a nut 56 adapted to be received on the projecting portion of the threaded shank 51 of the member 50.

Figure 2:
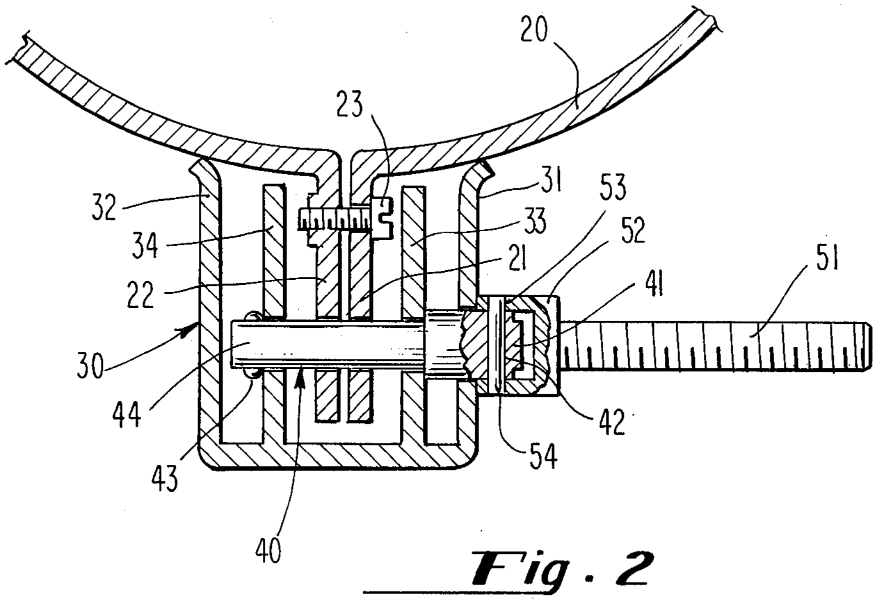
FIG. 2 is a view, in section, showing the first component of the extractor applied by pin 54 to the barrel lock to be extracted.
Figure 3:
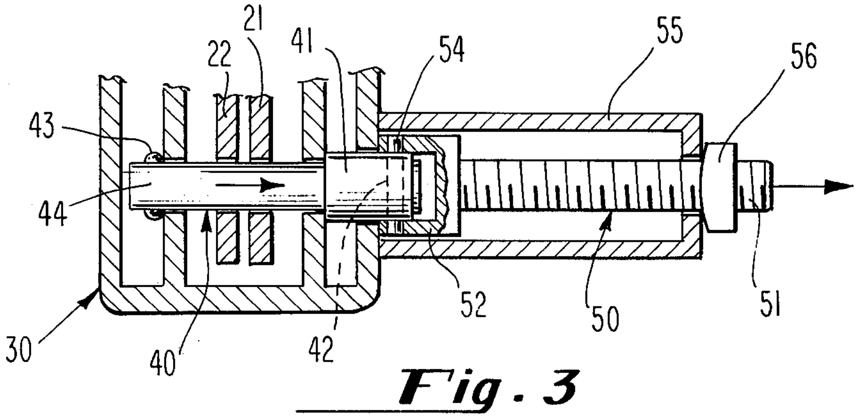
FIG. 3 is a view, in section, showing the other components of the extractor in place ready to withdraw the barrel lock.
Figure 4:
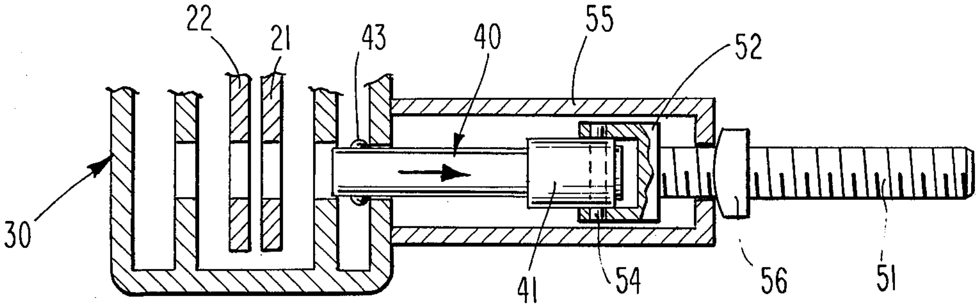
FIG. 4 is a view, in section, showing the barrel lock extracted by the extractor.

To extract a damaged or corroded barrel lock 40, the annular head 52 of member 50 is placed over the annular head 41 of the barrel lock 40 in such position that the holes 53 of the head 52 are in registry with the holes 42 in the head 41. Pin 54 is then inserted into the holes, as illustrated in FIG. 2. Sleeve 55 is then placed over member 50 with the forward end of sleeve 55 abutting against the side wall 31 of cover 30. In this position, as seen in FIG. 3, the outward end of the threaded shank 51 projects through hole 58 in the outward end of sleeve 55. Nut 56 is then threaded on to the shank 51 and tightened, thereby to apply a pulling force on shank 51 and causing it to move outwardly, thereby exerting a pulling force on barrel lock 40 and pulling it outwardly, in the direction of the arrow, as illustrated in FIGS. 3 and 4. The pulling force developed is sufficient to cause depression of the retaining ball detents 43 against their retainers and/or to deform the holes in at least the inner partition 34, and in the split-ring end extensions 22,21, as the barrel 44 is pulled through. It will be seen that to release the split-ring end extension 22,21, it is unnecessary to pull the ball detents 43 completely through the outer partition 33, although this is shown in FIG. 4.

To operate the extractor in close quarters against the meter box, the sleeve 55 may have a C-shaped cross section. That is, the sleeve may be sliced away longitudinally on the side facing the meter box.

While the head 52 of member 50 has been shown to be annular, which is preferred, the head 52 could have a square, or octagonal, or other external shape, but should of course, have a circular recess to conform to the outside shape and size of the annular head 41 of the barrel lock. The sleeve 55, at least the recess or forward part of the bore of sleeve 55, would then have a square, octagonal or other shape corresponding to that of the head 52 of the member 50.

It is to be noted that prior art extractor devices are not suitable for removal of damaged or corroded barrel locks from kilowatt-hour meters. The barrel lock head 41 projects beyond the cover housing 30 for such a short length, and the material of the head is of such hardened steel, that known forms of extractor devices are unable to obtain a sufficient purchase on the barrel lock head to effect extraction of the barrel lock. What is claimed is:

1. An extractor tool for a hardened steel barrel lock having a hollow barrel, ball detents projecting radially outwardly from said barrel, means within said barrel retaining said ball detents in radially outward position, an enlarged annular head at the outward end of said barrel, and a pair of small aligned diametral holes in said heat for receiving a seal-wire, said holes having a diameter not greater than one-tenth inch, said barrel lock being within a cover housing, said head projecting slightly therefrom to expose said seal-wire holes, said seal-wire holes being closely adjacent said housing, said extractor tool comprising:

a. a first extractor member having an elongated externally threaded shank and an enlarged annular head having a recess the diameter of which corresponds to the outer diameter of the annular head of the barrel lock which is to be extracted and adapted to receive said barrel lock head in its recess, said head of said first extractor member being provided with a pair of holes in diametral alignment with each other;

b. an integral connector pin of hardened steel having a length corresponding to the outer diameter of the enlarged head of said first extractor member and of sufficiently small diameter to be received in the small aligned holes in the head of said barrel lock, said pin inserted into the pair of aligned holes in the head of said first extractor member and into the small aligned holes in the head of said barrel lock when said head of said barrel lock is received within the recess in the head of said first extractor member, whereby said pin connects said first extractor member to said barrel lock head;

c. a hollow cylindrical extractor sleeve having a cylindrical bore the diameter of which corresponds to the outside diameter of the annular head of said first extractor member and adapted to receive said head, said sleeve having at its outward end an axial opening through which the outward end of the threaded shank of the first extractor member is adapted to project when said sleeve is placed over the head of said first extractor member and receives said head in its recess;

d. a nut adapted to be received on the projecting portion of said threaded shank, whereby tightening of said nut on said shank against said sleeve when the forward end of said sleeve is in abutment against the housing of said barrel lock is effective to exert a pulling force on said shank thereby to exert on said barrel lock on both sides of the center axis thereof outward pulling forces which are parallel to the center axis of said barrel lock and of substantially equal magnitude.

* * * * *

UNITED STATES PATENT OFFICE

CERTIFICATE OF CORRECTION

Patent No. 4,060,884 Dated December 6, 1977

Inventor(s) Earle B. Hamilton

It is certified that error appears in the above-identified patent and that said Letters Patent are hereby corrected as shown below:

Column 2, line 24 for "over" read --provide--;

Column 4, line 18 for "heat" read --head--

Signed and Sealed this

*Twenty-eighth* Day of *March 1978*

[SEAL]

*Attest:*

RUTH C. MASON
*Attesting Officer*

LUTRELLE F. PARKER
*Acting Commissioner of Patents and Trademarks*